US007035771B2

(12) United States Patent
Butt et al.

(10) Patent No.: US 7,035,771 B2
(45) Date of Patent: Apr. 25, 2006

(54) SCALABILITY TEST AND ANALYSIS

(75) Inventors: Hammad Butt, Bellevue, WA (US); Costin Hagiu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/181,285

(22) Filed: Jul. 14, 2005

(65) Prior Publication Data

US 2005/0267711 A1 Dec. 1, 2005

Related U.S. Application Data

(63) Continuation of application No. 10/811,629, filed on Mar. 29, 2004.

(51) Int. Cl.
*G06F 15/00* (2006.01)

(52) U.S. Cl. ...................... 702/186; 709/224

(58) Field of Classification Search ............... 702/80, 702/108, 117, 118, 119, 122, 123, 183, 186, 702/188, 189; 711/170; 700/295; 379/15.01
See application file for complete search history.

(56) References Cited

U.S. PATENT DOCUMENTS 6,542,854 B1 * 4/2003 Yang et al. ............... 702/186
6,601,020 B1 * 7/2003 Myers ...................... 702/186

OTHER PUBLICATIONS

Performance Testing of the Citrix® MetaFrame® Platform http://www.rttsweb.com/services/citrix/index.cfm.
Scapa Technologies —New Citrix MetaFram Stressing Tool Released, Press Release, http://scapatech.com/news_events/press_ releases/2002-18-03.html.
A.J. Fied, P.G. Harrison, J. Parry, "Response Times in Client-Server Systems", pp. 1-18.
D. Pegler, D. Hutchison and D. Shepherd, "Scalability Issues for Mass Multimedia Storage Systems", 1996 The Institution of Electrical Engineers, pp. 1-7.
K. Kant and P. Mohapatra, "Scalable Internet Servers: Issues and Challenges", pp. 1-8.

(Continued)

*Primary Examiner*—Marc S. Hoff
*Assistant Examiner*—Mohamed Charioui
(74) *Attorney, Agent, or Firm*—Banner & Witcoff, Ltd

(57) ABSTRACT

Apparatuses and methods to test whether a multi-user system will provide satisfactory performance are described. Response times are logged for each individual user, and the measurements are aggregated together in a single file at the end of the test. For each action type, a graph is built that correlates the distribution of the response times as a function of the user load. A break point is determined for each action type at which a response time exceeds a predetermined threshold. By analyzing the different break points, the number of users that can be supported by the multi-user computer system is determined. Additionally, an optimal amount of memory may be determined to support a user load. The amount of memory required per user is computed based on the user load at the projected point where a line that is determined from page output peaks intersects the page input line.

6 Claims, 8 Drawing Sheets

OTHER PUBLICATIONS

J. Major, "*Client/Server Capacity Planning and Relative Throughput Capacity Estimation*", Demand Technology, Inc., Capacity Management Review, Apr. 1996, pp. 3-9.

S. Nishio, "*MASEMS: A Scalable and Extensible Multimedia Server*", Proceedings of the 1999 International Symposium on Database Applications in Non-Tradtional Environments.

*Windows Server 2003—Terminal Server Capacity and Scaling, Whitepaper*, 2003 Microsoft Corporation, pp. 1-39.

\* cited by examiner

SCALABILITY TEST AND ANALYSIS

This is a continuation of U.S. patent application Ser. No. 10/811,629 entitled "Scalability Test and Analysis" filed Mar. 29, 2004. The parent application is incorporated herein by reference in its entirety.

BACKGROUND

An application server, which may function as a multi-user computer system, often supports many users for executing one or more application programs from remote terminals such as workstations and personal computers. An application server can assume different architectures including that of a terminal server. When deploying an application server, it is important that the application server be properly configured to provide satisfactory performance for the expected number of users.

With the prior art, the performance of a multi-user computer system is often gauged by measuring some global system metric such as the processor utilization rate or the available system memory. However, an important performance indicator for an application server is the server's responsiveness as perceived by a user. Each user may be autonomously generating an action (e.g., entering a keystroke) through the user's remote terminal. A corresponding application program processes the action and provides a response to the user. If the time to respond exceeds a performance expectation, the user may perceive that the system is performing unsatisfactorily. Moreover, a multi-user computer system may support different types of users, where each type of user is characterized by different usage profiles. One type of user may be using application programs that place a large demand on the processor resources of the multi-user computer system. A second type of user may use application programs that place a relatively small demand on the processor resources but may enter keystrokes at a relatively high rate. Another type of user may use application programs that place a relatively large demand on the memory resources of the multi-user system. Moreover, different types of users may share application programs with each other. However, the different types of users may enter inputs at much different speeds (for example, a word processor expert versus an engineer who uses one finger to type).

Even though a global system metric may indicate that the multi-user compute system, as configured, provides satisfactory performance, a user may perceive the performance as not being satisfactory. On the flip side, the global system metric may indicate unsatisfactory performance although a user may perceive satisfactory performance.

There is a real need to provide a methodology and test tools that enable a system administrator to test a configured multi-user system to determine whether the multi-user system will provide satisfactory performance, with respect to a user's experience, even though the multi-user system is supporting different types of users and different application programs.

SUMMARY

Aspects of the present invention provide system and methods to test whether a multi-user system, e.g., a terminal server, will provide satisfactory performance as perceived by a user. The multi-system user may support different types of users that place different demands on the system resources and that utilize different application programs which stress the system resources in different ways.

One aspect of the invention is to aggregate performance results, where each performance measurement indicates the response time for the multi-user computer system to provide a response to a user input. The response times are logged for each individual user, and the measurements are aggregated together in a single file at the end of the test. The aggregated data are subsequently split into different sets of performance results, in which each set of performance results is associated with a different user actions type. For each action type, a graph is built that correlates the distribution of the response times as a function of the user load. A break point is determined for each action type in which a response time exceeds a predetermined threshold. By analyzing the different break points, the number of users that can be supported by the multi-user computer system is determined.

With another aspect of the invention, an optimal amount of memory is determined to support a user load. During a test run, several indicators of memory management activity are collected. A progression of working set trimming is correlated to paging activity. With a variation of the invention, the amount of memory required per user is computed based on the user load at the projected point where a line that is determined from page output peaks intersects the page input line.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Figure 1:
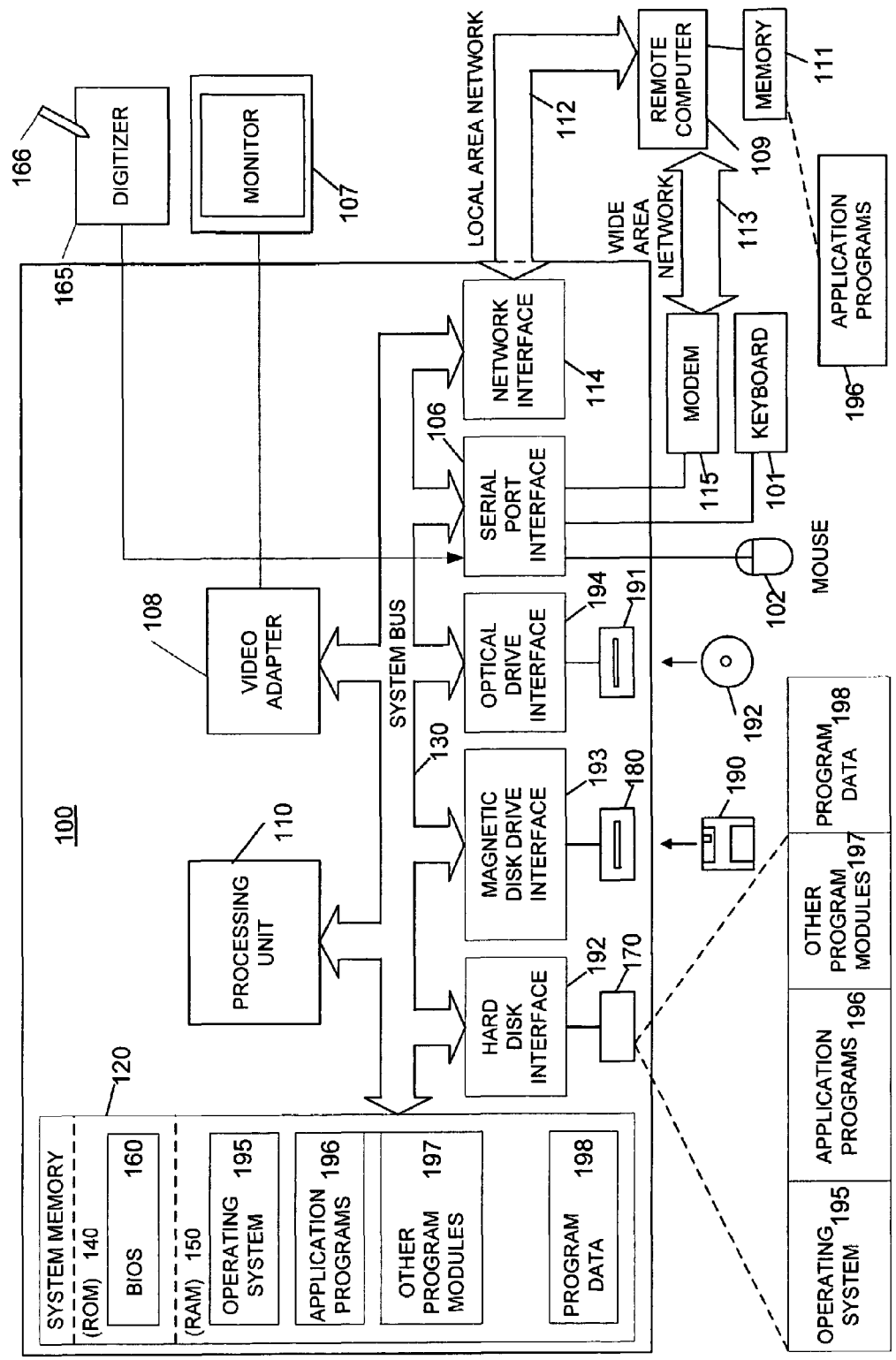
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It—will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. A pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

The architecture of computer 100 supports various computer functions including a multi-user computer (e.g., a terminal server) and a client terminal as will be discussed. (However, a terminal server may not be configured with some of the peripheral devices, e.g., digitizer 166, as may be configured with a client terminal.)

Paging performance may be an important consideration when configuring computer 100. Referring to FIG. 1, application program 196 is fetched from RAM 150 and executed by processing unit 110. With a multi-user computer system, a plurality of users may be executing the same or different application programs. A thread corresponds to a user executing a particular application program. If RAM 150 does not have sufficient available memory to execute an application program for a user, computer 100 may move unused memory space (page output) from RAM 150 to disk 170 to free memory space 150 to execute a thread that is being executed by processing unit 110. If memory contents in disk 170 needs to be executed, the memory contents are moved (page input) from disk 170 to RAM 150. The movement of memory contents between RAM 150 and disk 170 is often referred as paging. If paging activity becomes excessive, computer 100 may experience "thrashing", in which computer 100 expends excessive resources for overhead memory operations rather than for executing of application programs. In such a situation, a user experiences substantial degradation in performance.

Figure 2:
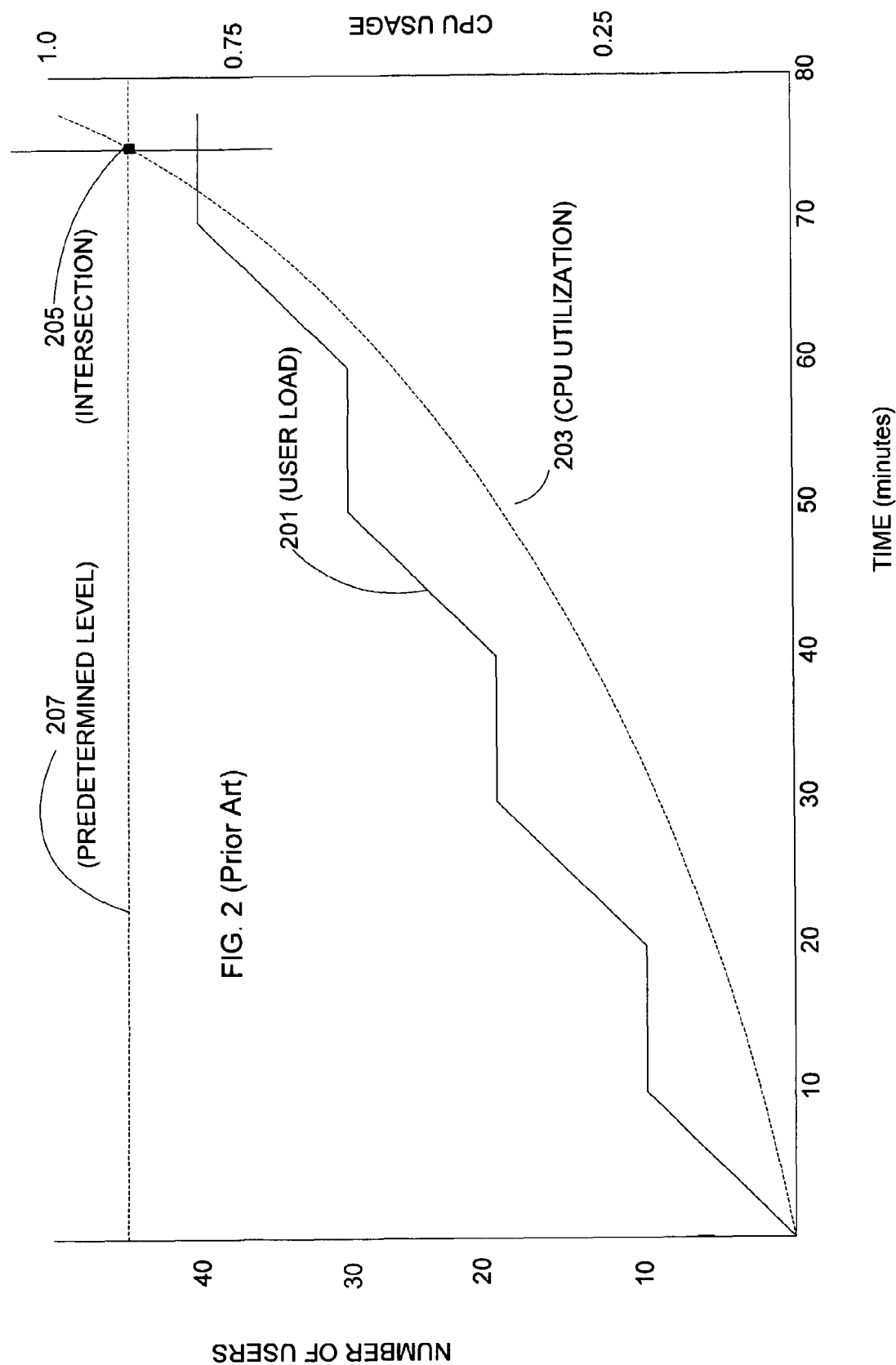
FIG. 2 shows an approach for determining a maximum of users for a computer system in accordance with prior art.

FIG. 2 shows an approach for determining a maximum number of users for a computer system in accordance with prior art. The CPU utilization, as a function of the number of users, (as represented by CPU curve 203) is simulated by a test configuration. The CPU utilization is limited by predetermined maximum acceptable level line 207. In the example shown in FIG. 2, the predetermined maximum acceptable level is approximately 90%. The maximum number of users that can be supported within the constraint of not exceeding the predetermined maximum acceptable level is determined from intersection 205 of CPU curve 203 and predetermined maximum acceptable level line 207. In the example shown in FIG. 2, the maximum number of users is approximately 37. Even though the performance, as gauged by the utilization of a computer resource, may be determined to be satisfactory or unsatisfactory, the performance, as perceived by a user, may be to the contrary.

Figure 3:
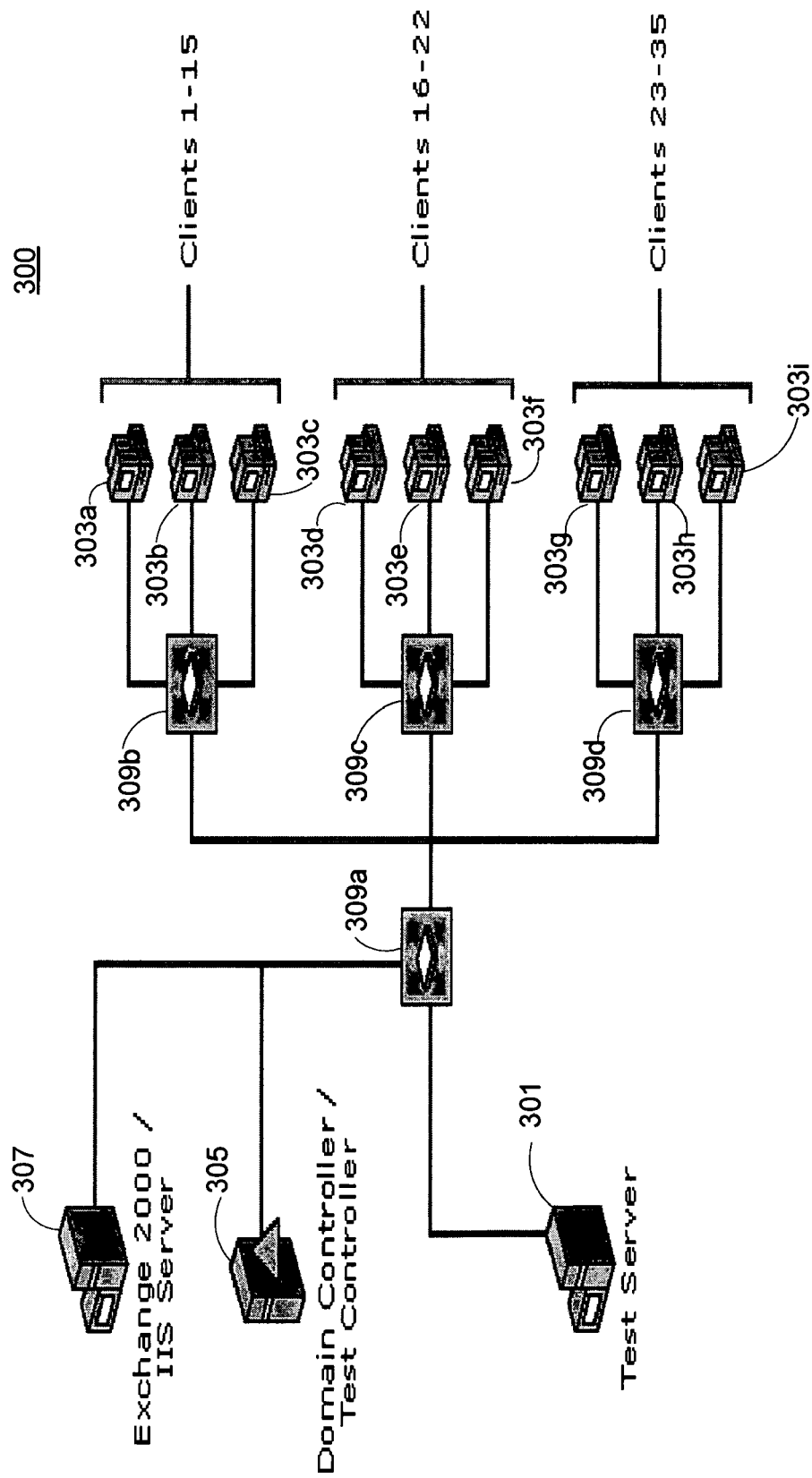
FIG. 3 shows a testing laboratory apparatus in accordance with an embodiment of the invention.

FIG. 3 shows a testing laboratory apparatus 300 in accordance with an embodiment of the invention. Testing laboratory apparatus 300 comprises a test terminal server 301 (which functions as a multi-user computer system), a plurality of client terminals 303a–303i, test controller 305, exchange server 307, and routers 309a–309d.

In the exemplary embodiment, the terminal server may comprise one of the following configurations.
HP (Hewlett Packard) DL 360G3
2× Intel Xeon 2.4 GHz CPUs
4 GB RAM.
HP DL 560
4× Intel Xeon MP 2 GHz CPUs
6 GB RAM In order to test the number of users that can be supported by terminal server 301, terminal server 301 is configured with processor capability and memory capacity that reflects the configuration of the terminal server that will be actually installed subsequent to testing.

Terminal server 301 executes application programs as invoked from client terminals 303a–303i and routed through routers 309a–309d. Different user types (e.g., knowledge workers and data entry personnel) may utilize different application programs and may generate a different pattern of user actions.)

Test controller 305 configures laboratory configuration 300. For example, test controller 305 activates a subset of the plurality of client terminals 303a–303i with test script that generates user actions that simulate a desired user environment. (The different action types are referred as a set of user actions.) For example, a simulated action type may be file write or cut operations that a user would typically use during an application program session. Exchange server 307 provides network connectivity for Internet services in order to simulate applications (e.g., e-mail applications or Internet browsers) requiring network connectivity.

Figure 4:
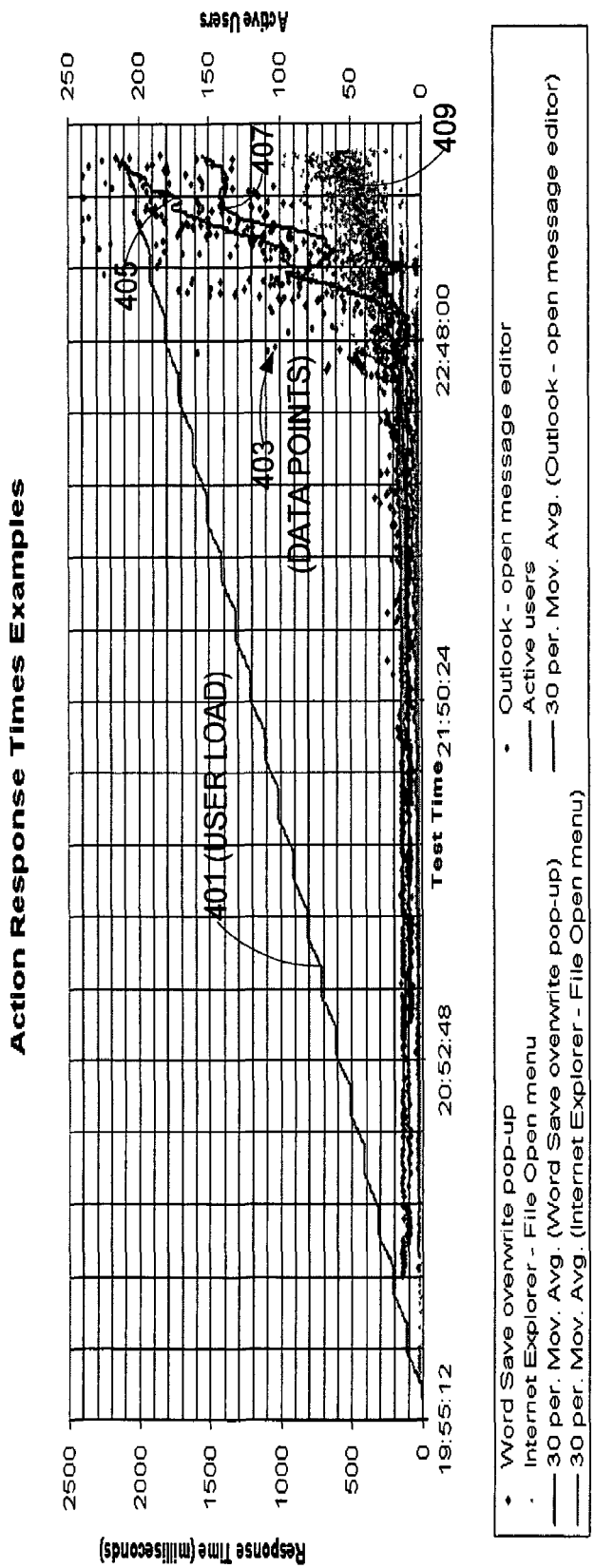
FIG. 4 shows exemplary laboratory results for action response times with a profile of users in accordance with an embodiment of the invention.

FIG. 4 shows exemplary laboratory results for action response times with a profile of users for various user action types (word save overwrite pop-up, Microsoft® Internet Explorer file open menu, and Outlook® open message editor) in accordance with an embodiment of the invention. Curve 401 represents a user load and data points 403 represents data, where each point corresponds to a response time for a simulated user action.

An automated server and client workstation reset is performed before each test-run in order to revert all components to a clean state. Response times, based on user action types, are used to determine when or if a terminal server is overloaded. Client-side scripts drive the user simulation and record the response times for a set of simulated user actions.

The scripts contain many sequences. A sequence starts with the test script sending a key stroke through a client terminal 303 to one of the applications running in the session on test server 301. As a result of the key stroke, a string is displayed by the application. For example, Ctrl-F opens the File menu that would then display the Open string.

Test scripts are constructed for different user types. For example, in the embodiment, knowledge workers and data entry workers are simulated. For a simulated knowledge worker, simulated keystrokes are generated at a typing speed of approximately 35 words per minute. In the embodiment, a knowledge worker is a worker who gathers, adds value to, and communicates information in a decision support process. The cost of downtime is variable but highly visible. Projects and ad-hoc needs towards flexible tasks drive these resources. Knowledge workers make their own decisions about what to work on and how to accomplish the task. The usual tasks knowledge workers perform are marketing, project management, sales, desktop publishing, decision support, data mining, financial analysis, executive and supervisory management, design, and authoring.

The exemplary embodiment shown in FIG. 3 also simulates data entry workers. Simulated keystrokes are generated at a typing speed of approximately 35 words per minute. A data entry worker inputs data into computer systems including transcription, typists, order entry, clerical, and manufacturing. For client terminal 303 being configured for a simulated data entry worker, test controller 305 loads the following script into the client terminal 303. (Separate test script is loaded to simulate a knowledge worker.)

Connect User "smcxxx"
OpenFile—Open File in Excel
Loop (forever)
　Clear spread sheet
　Move to First Row
　Type Column headers
　Loop (10)
　　Enter 10 Data Rows in spread sheet
　　Select last 10 Rows
　　Format Data
　　Save File
　End Loop
End Loop In the embodiment, each client terminal is configured for specific user types. Specific test script is loaded in each client terminal by test controller 305 according to the user type being simulated by the client terminal. Also, other embodiments may simulate different user types according to the operating environment being simulated.

The response time is the time from the key stroke to the display of the string at client terminal 303. To accurately measure the response time, the response measurement is calculated by taking two initial time readings, $t_{i1}$ and $t_{i2}$, from a reference time source before and after sending the key stroke. $T_{i1}$ is the time when the test manager 305 sends the instructions to client terminal 303, and $t_{i2}$ represents client terminal 303 sending the keystroke to test server 301. A third reading, $t_{f3}$, is made after the corresponding text string is received by client terminal 303. Time is measured by milliseconds. Based on these values the response time is estimated as belonging to the interval $(t_{f3}-t_{i2}, t_{f3}-t_{i1})$. Typically, the measurement error (the time between $t_{i1}$ and $t_{i2}$) is less than 1 millisecond (ms), and the response values are approximated by $t_{f3}-t_{i1}$.

For each scenario, the Test Manager workstation 305 starts groups of ten client sessions on the client terminals 303 with a 30-second interval between each session. After the group of ten client sessions is started, a 5-minute stabilization period is observed in which no additional sessions are started. After the stabilization period, the Knowledge Worker script starts the four applications it will use in the test within five minutes. This prevents login activity interference between each group of ten client sessions. For each action type, as the number of users log on, a degradation point is determined when the response times increase to a value that is deemed significant.

For action types that have an initial response time of less than 200 ms, the degradation point is considered to be where the average response time is more then 200 ms and 110% of the initial value.
　For action types that have an initial response time of more than 200 ms, the degradation point is considered to be the point at which the average response time increases with 10% of the initial value.

This criteria is based on the assumption that a user will not notice degradation in a response time while this is lower then 200 ms. There are several reasons for response-time degradation. When degradation in response time is attained for approximately the same number of users, CPU saturation is the main reason. Response-time degradation that can be attributed to actions relating to file IO, such as opening a dialog box to select a file to open or save, is due to IO limitations. Also, some actions might exhibit a "noisy" degradation where a small number of response times randomly having values noticeable higher than average, without influencing the average value noticeably.

FIG. 4 shows three examples of response-time degradation on a CPU saturated system, where each example corresponds to a different action type (word save overwrite pop-up, Internet Explorer file open menu, and Outlook open message editor). The aggregated points for each action type are separately analyzed. In the exemplary embodiment shown in FIG. 4, a curve is fitted for each action type using a moving average. Curve 405 corresponds to the moving average for action type Outlook open message editor. Curve 407 corresponds to the moving average for action type Word save overwrite pop-up. Curve 409 corresponds to the moving average for action type Internet Explorer file open menu. The embodiment may aggregate and analyze performance data for other action types and application programs.

The test harness supports a series of tests that determine system load threshold based on a canary script that is running between the logon groups while the system is stable. The canary script is run before any users are logged onto the system, and the time the script takes to complete (elapsed time) is recorded. This elapsed time becomes the baseline and is deemed to be the baseline response rate for a given configuration of server. This method would consider that maximum load is reached when the total time needed for running the canary script is 10% higher than the initial value. The response time method is considered to be more accurate because it measures the key parameter for the actual user experience, it takes into account the login period impact and provides a richer data support for decision making. The canary-script method can still be more efficient for setups that support a small number of users where the response time method does not provide a large enough sample of response time values.

One key parameter that is also monitored is the total cycle time for a work unit performed by a user. The total cycle time should be a constant value especially for comparison tests (cross-platform or when testing for special features). Tests that run with different cycle times are effectively performing a different amount of work in the same unit of time, thus consuming more resources in the time unit and can not be compared directly.

Figure 5:
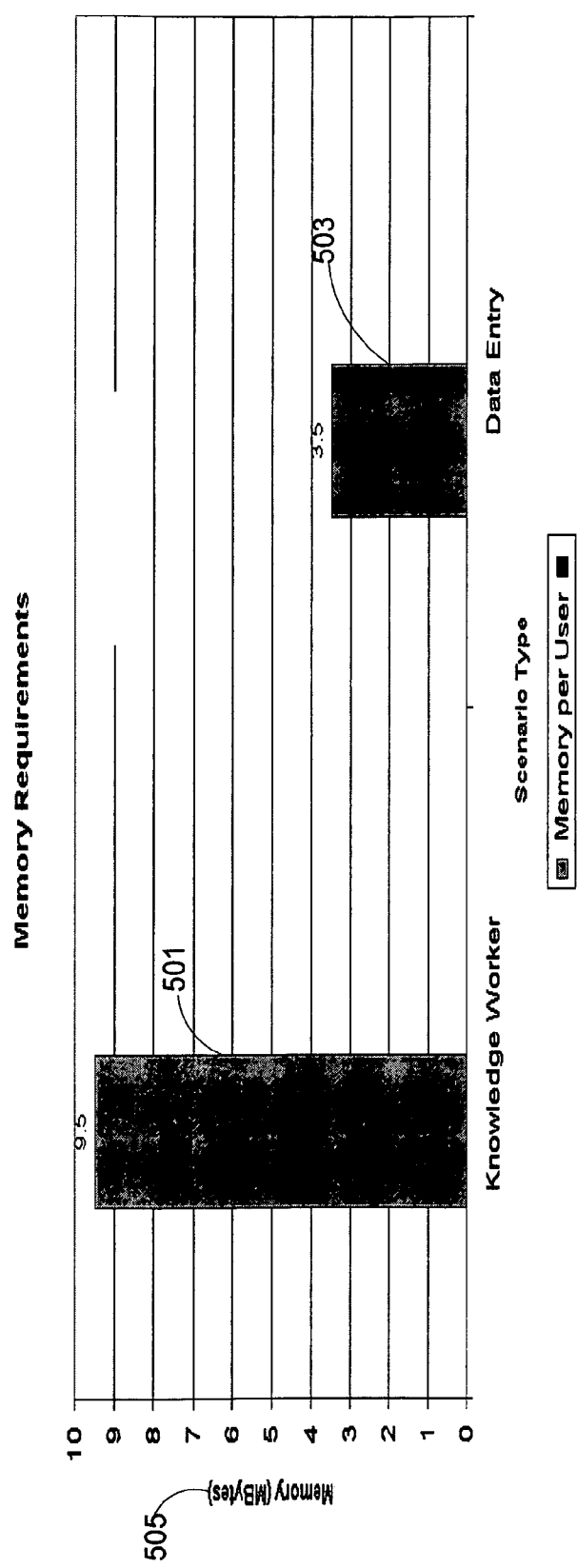
FIG. 5 shows memory usage per user for different scenario types in accordance with an embodiment of the invention.

FIG. 5 shows memory usage per user 505 for different user types in accordance with an embodiment of the invention. In the example shown in FIG. 5, knowledge worker 501 requires approximately 9.5 MBytes per user and data entry worker 503 requires approximately 3.5 MBytes per user. The embodiment may support other user scenarios and other user types.

Figure 6:
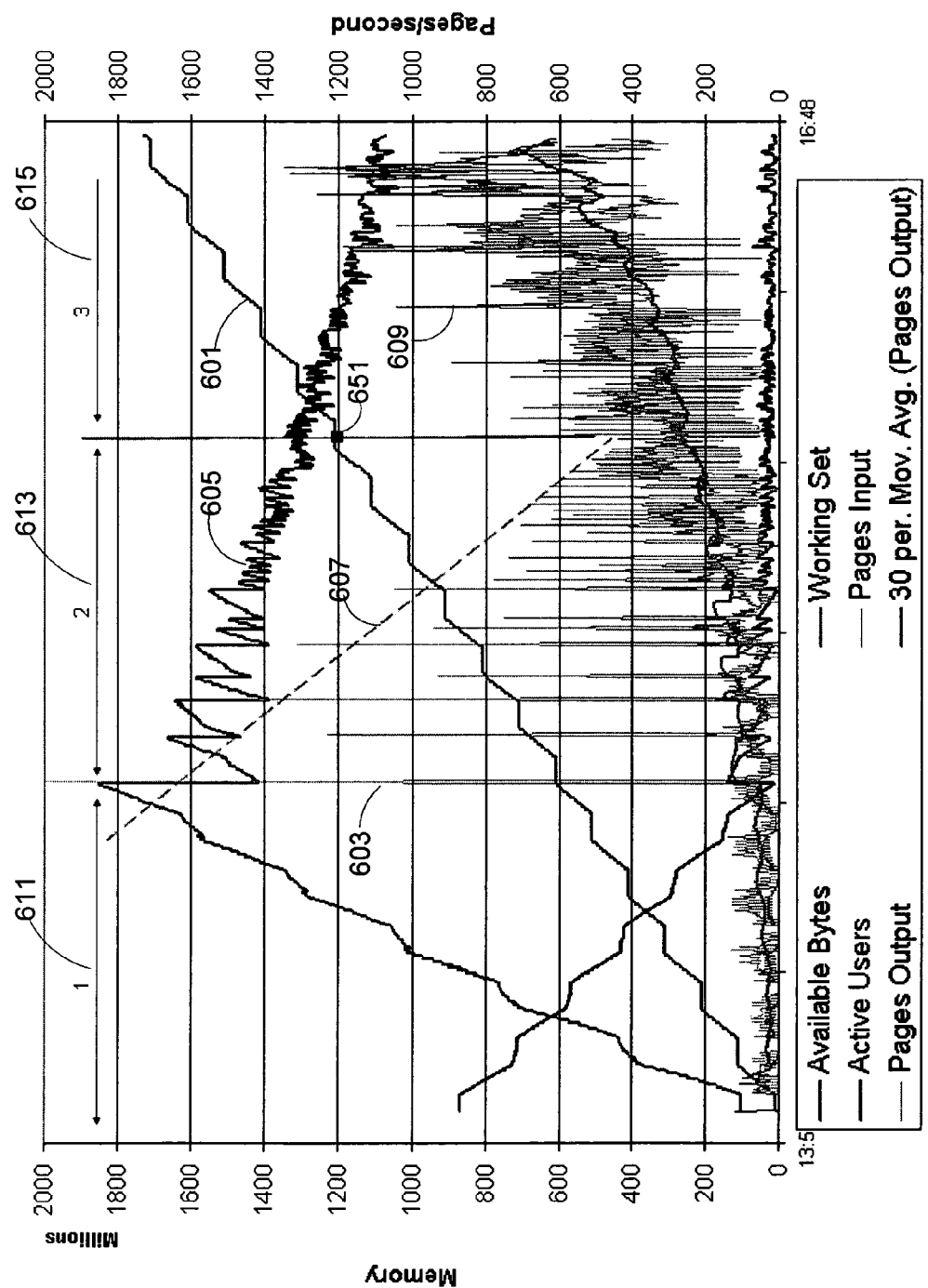
FIG. 6 shows exemplary laboratory results for memory usage with a profile of users in accordance with an embodiment of the invention.

FIG. 6 shows exemplary laboratory results for memory usage with a profile of users in accordance with an embodiment of the invention. Determining the amount of memory necessary for a particular user of a terminal server is complex. It is possible to measure how much memory an application has committed (i.e., the amount of memory that an application can access as guaranteed by the operating system). However, the application does not necessarily use all of that memory. Moreover, the application typically does not use all the allocated memory at any one time. The subset of committed bytes that an application has recently accessed is referred to as the working set of that process. Because the operating system can page the memory outside a process's working set to disk without a performance penalty to the application, the working set, if used correctly, is a much better measure of the amount of memory needed.

The Process performance object's Working Set counter (used on the _Total instance of the counter to measure all processes in the system) is a qualitative indication of how many bytes have been recently accessed by threads in the process. However, if the free memory in the computer is sufficient, pages are left in the working set of a process even if they are not in use. If free memory falls below a threshold, unused pages are trimmed from working sets. The method used in these tests for determining memory requirements is not typically as simple as observing a performance counter. The method should account for the dynamic behavior of a memory-limited system.

The most accurate method of calculating the amount of memory required per user is to analyze the results of several performance counters (Memory\Pages Input/sec, Memory\Pages Output/sec, Memory\Available Bytes and Process\Working Set (Total_) in a memory-constrained scenario. When a system has abundant physical RAM, the working set initially grows at a high rate, and pages are left in the working set of a process even if the pages are not in use. Eventually, when the total working set tends to exhaust the amount of physical memory, the operating system is forced to trim the unused portions of working set until enough pages are made available to free up the memory pressure. This trimming of unused portions of the working sets occurs when the applications collectively need more physical memory than is available, which is a situation that requires system to constantly page to maintain the working sets of all the processes. In operating systems theory terminology, this constant paging state is referred to as thrashing.

FIG. 6 shows the values of several relevant counters from a Knowledge Worker test when performed on a server with 1024 MB of RAM installed. The results are very close to what is expected. During the laboratory test shown in FIG. 6, test controller 305 activates the number of active users as represented by user load 601.

Zone_1 611 represents the abundant memory stage. This is when physical memory is greater than the total amount of memory that applications need. In this zone, the operating system does not page anything to disk, even seldom-used pages.

Zone_2 613 represents the stage when unused portions of the working sets are trimmed. In this stage the operating system periodically trims the unused pages from the processes' working sets whenever the amount of available memory drops to a critical value. This process is illustrated by memory curve 605, where discontinuities (e.g., discontinuity 604) are indicative that the management system is paging out memory from RAM 150 to disk 170 (as illustrated in FIG. 1). Each time the unused portions of allocated memory are trimmed, the total working set value decreases, increasing the amount of available memory, resulting in a significant number of pages being written to page file. As more processes are created, more memory is needed to accommodate corresponding working sets. The number of unused pages that can be collected during the trimming process decreases. The pages input rate (as shown by curve 609) is mostly driven by pages required when creating new processes. The average is typically below the rate of pages output (as shown by curve 603). This state is acceptable and applications typically respond well because only unused pages are being paged to disk.

Zone_3 615 represents the high pressure zone. The working sets are trimmed to a minimal value and mostly contain pages that are frequented by the greater number of users.

Page faults will likely cause the ejection of a page that will need to be referenced in the future, thus increasing the frequency of page faults. The output per second of pages (as shown by curve 603) will increase significantly, and the page output curve 603 follows to some degree the shape of page input curve 609. The system does a very good job of controlling degradation, almost linearly, but the paging activity eventually increases to a level where the response times are not acceptable.

In FIG. 6, the amount of physical memory appears to be greater than 1024 MB because the operating system does not start to trim working sets until the total required is well above 1600 MB. This is the due to cross-process code sharing, which makes it appear as if there is more memory used by working sets than is actually available.

The amount of memory needed can be determined from the number of users at the point 651 where the page-out activity starts increasing significantly (end of Zone_2 613 in FIG. 6). The amount of memory required per user can be estimated by dividing the total amount of memory in the system by the number of users at the end of Zone_2 613. Such an estimate does not account for the memory overhead required to support the operating system. The actual available memory size is adjusted for the amount of memory being used for overhead. A more precise measurement can be obtained by running the test for two different memory configurations (for example, 512 and 1024 MB), determining the number of users at the end of Zone_2 613 and dividing the difference in memory size (1024–512 in this case) by the difference of user number at end of Zone_2 613. In practice, the amount of memory required for the operating system can be estimated as the memory consumed before the test starts.

Although a reasonable amount of paging is acceptable, paging naturally consumes a small amount of the CPU and other resources. Because the maximum number of users that can be loaded onto a system is determined on systems that have abundant physical RAM, a minimal amount of paging typically occurs. The working set calculations assume that a reasonable amount of paging has occurred to trim the unused portions of the working set, but this only occurs on a system that is memory-constrained. If one takes the base memory requirement and adds it to the number of users, multiplied by the required working set, the result is a system that is naturally memory-constrained, and acceptable paging occurs. On such a system, one expects a slight decrease in performance due to the overhead of paging. The decrease in performance can reduce the number of users who can be actively working on the system before the response time degrades above the acceptable level.

Figure 7:
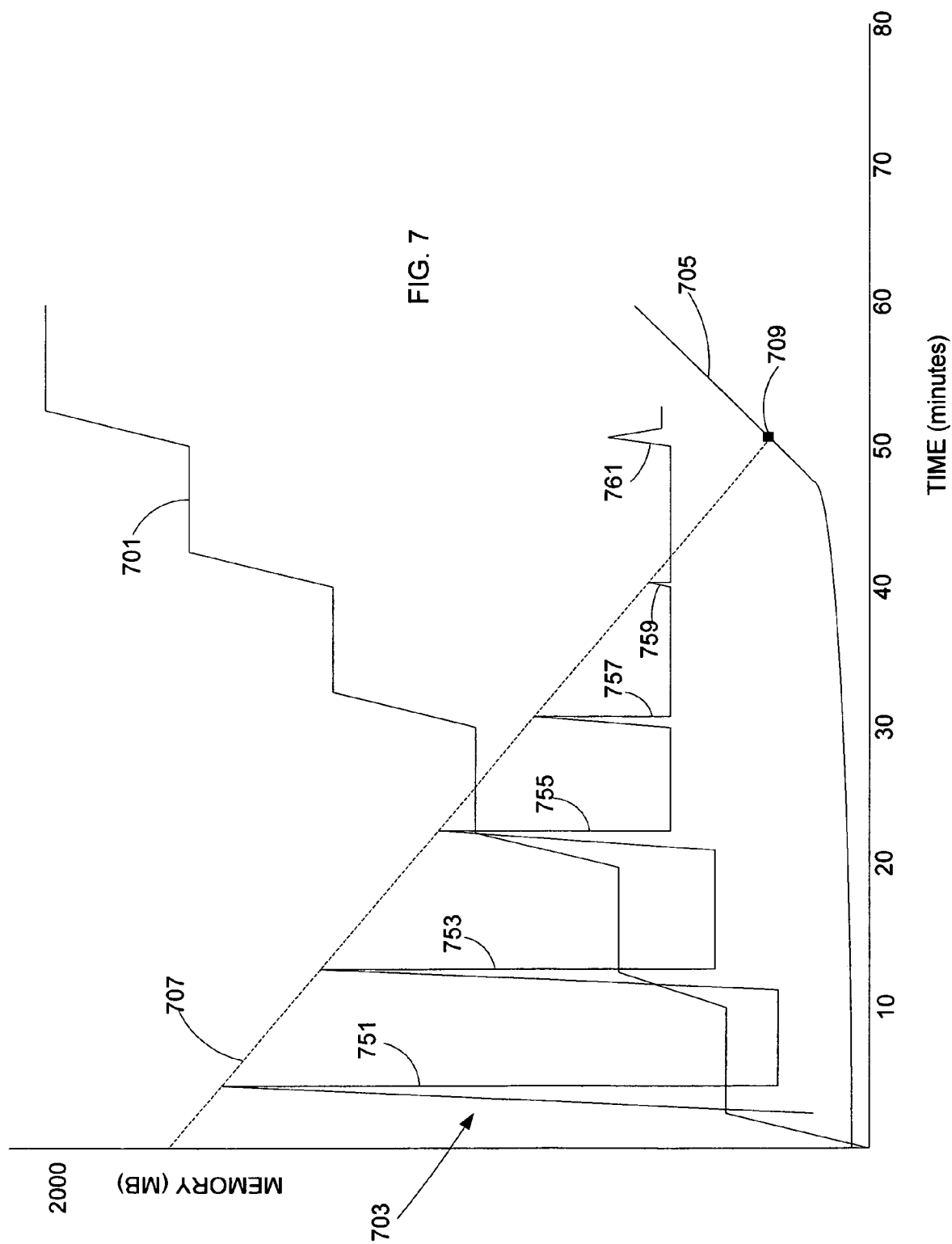
FIG. 7 shows FIG. 6 with reduced detail.

FIG. 7 shows FIG. 6 with reduced detail. Curve 701 represents the user load during the test simulation. Curve 703 shows peaks (751–761) that are associated with page output activity corresponding to curve 603 as shown in FIG. 6. Page output peaks are correlated to work set trimming illustrated by curve 605 shown in FIG. 6. Trend line 707 shows the downward trending of page output peaks 751–759. (Note that the downward trending occurs during zone_1 611 and zone_2 613 but trends upward in zone_3 615 as previously discussed.) Curve 705 is a fitted curve corresponding to the page input activity as shown by curve 609 in FIG. 6.

In the embodiment, the memory required for each user may be determined by the intersection of trend line 707 and fitted paging input curve 705. (There are various methods for fitting line 705 such as determining a running average and using regression analysis.) The required memory per user can be approximated by dividing the available memory size by the number of users corresponding to the intersection. The available memory is determined by subtracting the amount of memory needed for overhead operations from the total amount of memory configured for test server 301.

Figure 8:
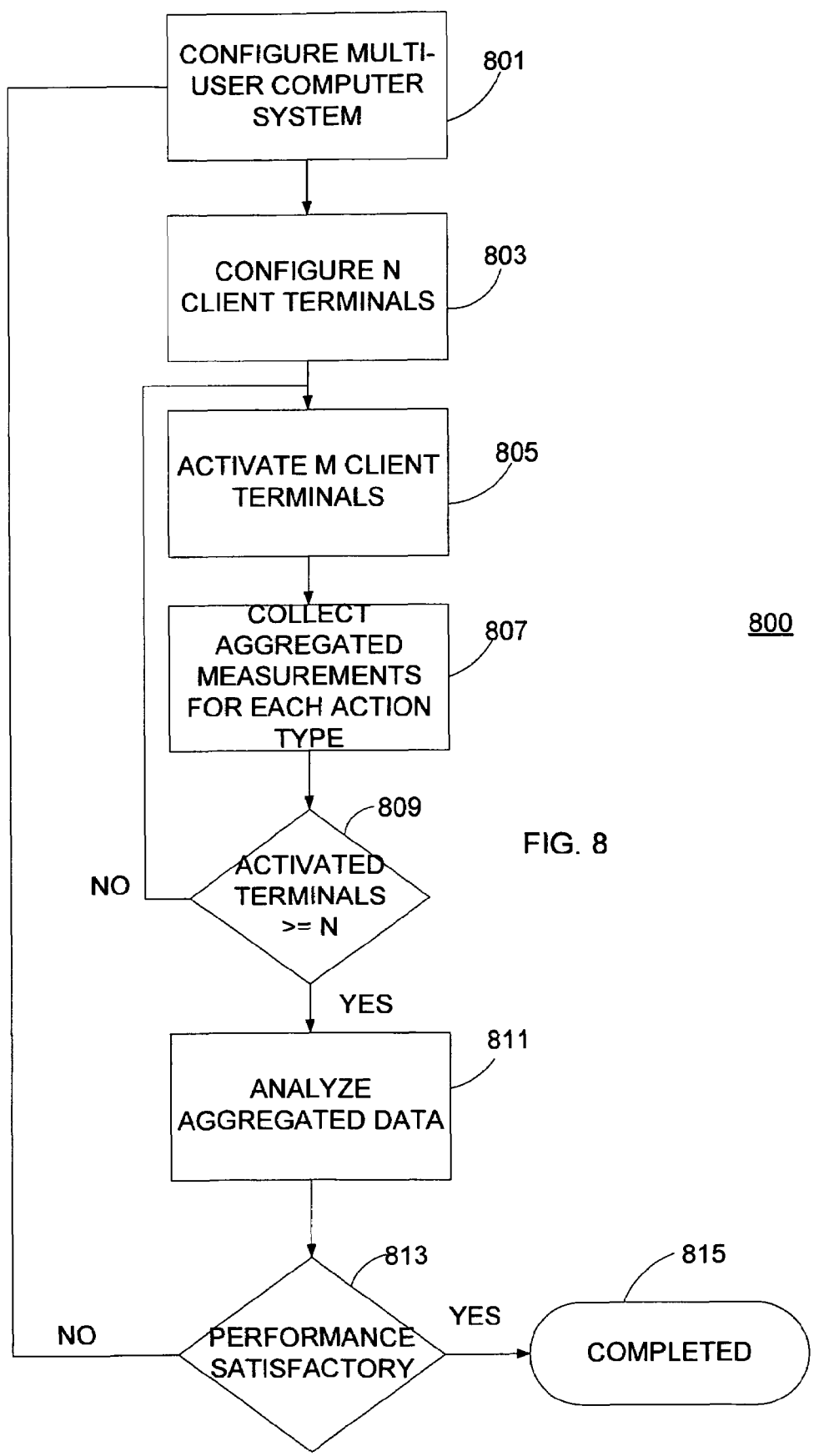
FIG. 8 shows a flow diagram for determining a number of users that can be supported by a multi-user computer system in accordance with an embodiment of the invention.

FIG. 8 shows a flow diagram 800 for determining a number of users that can be supported by a multi-user computer system in accordance with an embodiment of the invention. (Flow diagram 800 relates to the discussion for FIG. 4.) In step 801, test server 301 is configured for the simulation session. The configuration is determined from the desired processor (CPU) capacity and memory capacity. In step 803, test controller 305 configures client terminals (303a–303i, designated as N client terminals in the exemplary embodiment) for the desired mixture of user types being simulated in the session. In the embodiment, test controller 305 loads test script in the client terminals 303a–303i in order to generate simulated user actions during the simulation session.

In step 805, test controller 303 activates M client terminals. Aggregated performance measurements are collected by a collection module. In the embodiment, the functionality of the collection module may be distributed across the client terminals 303a–303i and test controller 305. However, other embodiments may implement the collection module with a different architecture.

In step 809, test controller 305 determines if additional client terminals should be activated. If so, step 805 is repeated to activate an additional M client terminals and to collect more aggregated performance measurements in step 807. If no additional client terminals should be activated (i.e., the test session is completed), then step 811 is performed. In step 811, the aggregated performance is processed so that performance data is separated (split) according to the action type. Each action type corresponds to a plurality the data points, where each data point corresponds to a response time with a simulated number of users. In the embodiment, a running average is determined for each action type in order to form a performance curve. A break point is determined for each action type where the performance curve exceeds an associated predetermined threshold as previously discussed.

In step 813, if the simulated performance satisfies a desired performance target, then process 800 is completed with step 815. However, if the simulation indicates that the desired performance target has not been achieved with the configuration of test server 301, then test server 301 may be reconfigured with additional resources and steps 801–813 are repeated.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A method for determining memory configuration scalability of a multi-user computer system, comprising:
   (A) loading a set of simulated actions grouped into action types and associated with a remote session;
   (B) collecting a plurality of indicators of memory management activity; and
   (C) correlating a progression of working set trimming with an increase of active users to determine a reciuired amount of memory for each user;
   wherein (C) comprises:
      (i) trending peaks of a page output curve to form a peak page output trending line;
      (ii) determining an intersection of the peak page output trending line to a page input line; and
      (iii) determining the required amount of memory for each user from the intersection.

2. The method of claim 1, wherein (iii) comprises:
   (1) determining a memory size component that is utilized for operating overhead of the multi-user computer system;
   (2) subtracting the memory size component from a total system memory size to approximate a user memory size component; and
   (3) dividing the user memory size component by a user load, the user load corresponding to the intersection.

3. The method of claim 1, further comprising:
   (iv) fitting page input data to form the page input line.

4. An apparatus for determining hardware configuration scalability for a multi-user computer system, comprising:
   a test controller;
   a plurality of client terminals that are configured by the test controller in accordance with at least one user type, wherein a set of user actions are generated;
   the multi-user computer system that executes at least one application proaram in response to the set of user actions;
   a collection module that measures response times and that separately aggregates the response times for each action type, each said action type being associated with a user type being simulated; and
   an analysis module that determines an associated break point for each said action type, wherein the associated break point corresponds to a minimally acceptable degree of performance in terms of response time for each said action type;
   wherein the test controller reconfigures the plurality of client terminals and the collection module repeats measuring corresponding response times for each said action type.

5. The apparatus of claim 4, wherein the analysis module is supported by the test controller.

6. A method for determining memory configuration scalability of a multi-user computer system, comprising:
   (A) loading a set of simulated actions grouped into action types and associated with a remote session;
   (B) collecting a plurality of indicators of memory management activity; and
   (C) correlating a progression of working set trimming with an increase of active users to determine a required amount of memory for each user;
   wherein (A)–(C) are performed with a first memory configuration, the method further comprising:
   (D) repeating (A)–(C) with a second memory configuration;
   (E) determining a user load difference and a memory size difference with respect to the first memory configuration and the second memory configuration;
   (F) dividing the memory size difference by the user load difference to determine the required amount of memory for each user.

* * * * *